US008909486B2

United States Patent
Kohno et al.

(10) Patent No.: US 8,909,486 B2
(45) Date of Patent: Dec. 9, 2014

(54) FLOW MEASURING DEVICE

(75) Inventors: Yasushi Kohno, Obu (JP); Takao Ban, Toyohashi (JP); Akitoshi Mizutani, Okazaki (JP)

(73) Assignee: Denso Corporation, Kariya (JP)

( * ) Notice: Subject to any disclaimer, the term of this patent is extended or adjusted under 35 U.S.C. 154(b) by 454 days.

(21) Appl. No.: 13/280,625

(22) Filed: Oct. 25, 2011

(65) Prior Publication Data

US 2012/0101745 A1    Apr. 26, 2012

(30) Foreign Application Priority Data

Oct. 26, 2010 (JP) ................................. 2010-239272

(51) Int. Cl.
G01F 1/696 (2006.01)
F02D 41/18 (2006.01)
F02D 41/28 (2006.01)
G01F 1/684 (2006.01)
G01F 1/72 (2006.01)

(52) U.S. Cl.
CPC ................ *F02D 41/18* (2013.01); *F02D 41/28* (2013.01); *G01F 1/6842* (2013.01); *G01F 1/696* (2013.01); *G01F 1/72* (2013.01); *F02D 2041/286* (2013.01); *F02D 2041/288* (2013.01)
USPC .......................................................... 702/45

(58) Field of Classification Search
CPC ... F02D 41/18; F02D 41/28; F02D 2041/286; F02D 2041/288; G01F 1/6842; G01F 1/696; G01F 1/72
USPC .......................................................... 702/45
See application file for complete search history.

(56) References Cited

U.S. PATENT DOCUMENTS

| | | | | | |
|---|---|---|---|---|---|
| 4,918,995 | A | * | 4/1990 | Pearman et al. | 73/861.02 |
| 5,050,428 | A | * | 9/1991 | Shimomura et al. | 73/114.32 |
| 5,817,932 | A | * | 10/1998 | Nishimura et al. | 73/114.34 |
| 6,470,741 | B1 | * | 10/2002 | Fathollahzadeh | 73/204.15 |
| 6,810,345 | B2 | * | 10/2004 | Matsumura et al. | 702/100 |

(Continued)

FOREIGN PATENT DOCUMENTS

| JP | S58-027016 | 2/1983 |
|---|---|---|
| JP | H08-094406 | 4/1996 |

(Continued)

OTHER PUBLICATIONS

U.S. Appl. No. 13/100,426, filed May 4, 2011, Mizutano et al.

(Continued)

*Primary Examiner* — Sujoy Kundu
*Assistant Examiner* — Lisa Peters
(74) *Attorney, Agent, or Firm* — Nixon & Vanderhye PC

(57) ABSTRACT

A flow measuring device includes a flow rate detecting part, an analog/digital conversion part, and a signal processing part. The flow rate detecting part detects a flow rate of air flowing through the passage, and outputs a flow voltage signal, which is a voltage in accordance with the flow rate. The analog/digital conversion part converts the flow voltage signal from the flow rate detecting part into digital data, which is flow digital data. The signal processing part performs calculation processing upon the flow digital data, which includes averaging of a predetermined number of consecutive pieces of the flow digital data, and outputs the averaged flow digital data as a flow rate signal. The predetermined number is equal to or larger than two.

4 Claims, 6 Drawing Sheets

(56) References Cited

U.S. PATENT DOCUMENTS

| | | |
|---|---|---|
| 6,891,491 B2 | 5/2005 | Nakamura et al. |
| 7,040,159 B2 * | 5/2006 | Akamatsu ............... 73/204.17 |
| 7,177,770 B1 * | 2/2007 | Hocken et al. ............... 702/45 |
| 7,349,813 B2 * | 3/2008 | Gutierrez et al. ............ 702/46 |
| 2005/0072225 A1 | 4/2005 | Kanke et al. |
| 2009/0299657 A1 | 12/2009 | Mizutani et al. |

FOREIGN PATENT DOCUMENTS

| | | |
|---|---|---|
| JP | 11-159393 | 6/1999 |
| JP | P2001-296167 A | 10/2001 |
| JP | P2002-071400 A | 3/2002 |
| JP | P2002-267516 A | 9/2002 |
| JP | P2009-288096 A | 12/2009 |
| JP | P2010-185777 A | 8/2010 |

OTHER PUBLICATIONS

Japanese Office Action dated Sep. 4, 2012, issued in corresponding Japanese Application No. 2010-239272 with English translation.

* cited by examiner

FLOW MEASURING DEVICE

CROSS REFERENCE TO RELATED APPLICATION

This application is based on and incorporates herein by reference Japanese Patent Application No. 2010-239272 filed on Oct. 26, 2010.

BACKGROUND OF THE INVENTION

1. Field of the Invention

The present invention relates generally to a flow measuring device including an A/D conversion circuit that converts a flow voltage signal, which is an output signal from a flow rate detecting part, into digital data and outputs the data. In particular, the present invention relates to a flow measuring device for an internal combustion engine.

2. Description of Related Art

A flow measuring device measures the amount of suction air of an engine for an automobile, for example. The flow measuring device includes a flow rate detecting part for detecting a flow rate of air passing through a flow passage, and outputs an output signal in accordance with the flow rate. This output signal fluctuates due to influence of the flow of air. Accordingly, there is a technology that performs averaging processing on the output signal to reduce the influence of the fluctuation of the output signal upon rotation fluctuation and torque fluctuation.

For example, it is described in JP-A-H11-159393 that an air flow rate is calculated based on an output signal from a flow measuring device, and that smoothing processing of the output signal from the flow measuring device is performed only during idle operation. As a result of this technology, accuracy in flow detection by the flow measuring device at the time of idle operation is improved. However, at times other than idle operation, if an unstable air flow is generated near the flow measuring device in the case of a large air flow rate, the output signal of the air flow rate is fluctuated, and rotation fluctuation and torque fluctuation may thereby be affected. Nevertheless, measures against this are not taken.

The present applicants have invented a technology that A/D converts and outputs a voltage signal (flow voltage signal) that is outputted from a flow rate detecting part in accordance with the flow rate of air inside the flow measuring device, and a technology that shortens a sampling period of A/D conversion for the flow voltage signal (see Japanese Patent Application No. 2010-107330).

In such a flow measuring device, data outputted from the flow measuring device may be loaded on an engine control unit (ECU), and then averaging processing may be performed thereon in the ECU. However, since the ECU loads the data of the flow measuring device with a predetermined period, if the sampling period of A/D conversion for the voltage signal is short, the ECU cannot load all the data, and accuracy of averaging is reduced, so that the flow detection accuracy may become low.

SUMMARY OF THE INVENTION

The present invention addresses at least one of the above disadvantages.

According to the present invention, there is provided a flow measuring device adapted to be attached to a flow passage. The flow measuring device includes a flow rate detecting part, an analog/digital conversion part, and a signal processing part. The flow rate detecting part is configured to detect a flow rate of air flowing through the passage and to output a flow voltage signal, which is a voltage in accordance with the flow rate. The analog/digital conversion part is configured to convert the flow voltage signal from the flow rate detecting part into digital data, which is flow digital data. The signal processing part is configured to perform calculation processing upon the flow digital data, which includes averaging of a predetermined number of consecutive pieces of the flow digital data, and to output the averaged flow digital data as a flow rate signal. The predetermined number is equal to or larger than two.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
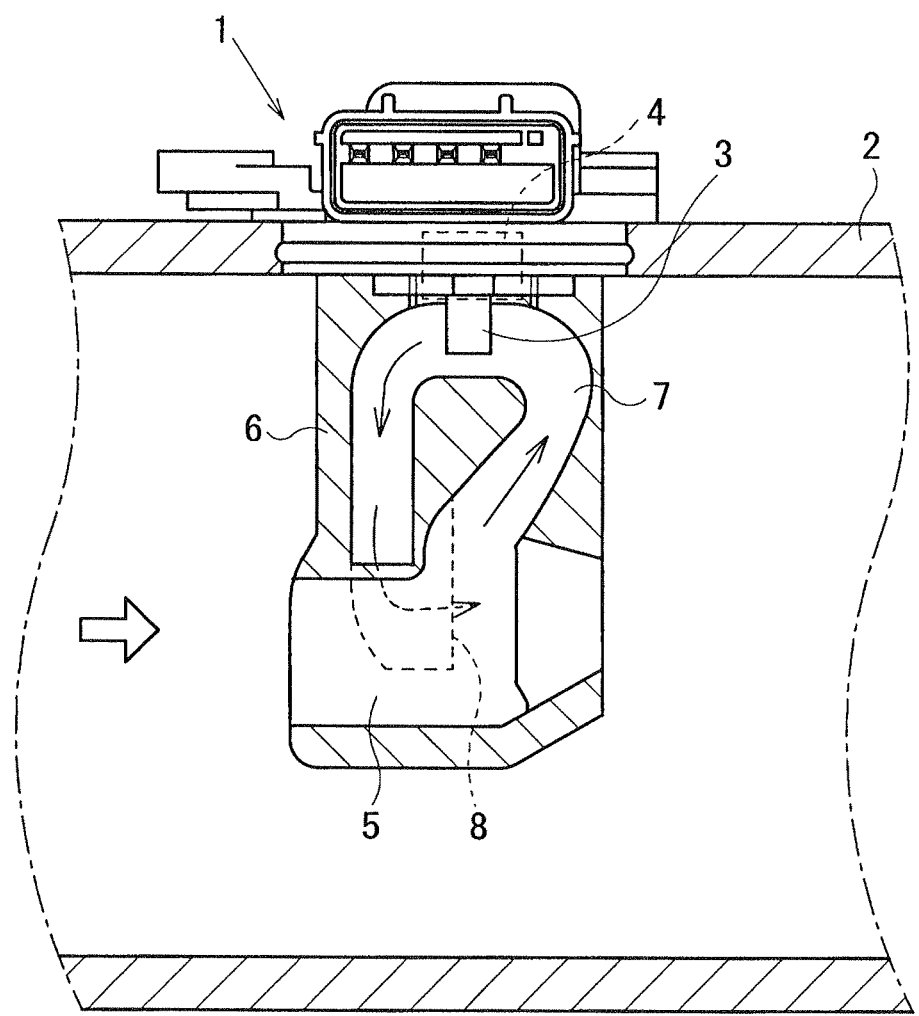
FIG. 1 is a sectional view illustrating a flow measuring device in accordance with a first embodiment of the invention.

A flow measuring device 1 of the invention includes a flow rate detecting part 3 that detects a flow rate of air flowing through a flow passages 5, 7 and that outputs a flow voltage signal Vq; an analog/digital conversion part 13 which converts the flow voltage signal Vq from this flow rate detecting part 3 into digital data; and a signal processing part 14 which performs calculation processing using flow digital data obtained by the analog/digital conversion part 13.

At the signal processing part 14, averaging of the flow digital data is performed upon at least a predetermined number (two or more) of consecutive data. Then, the averaged flow digital data is outputted as a flow rate signal. Thus, the flow measuring device 1 of the invention performs averaging processing of the flow digital data in the flow measuring device 1.

First Embodiment

Figure 2:
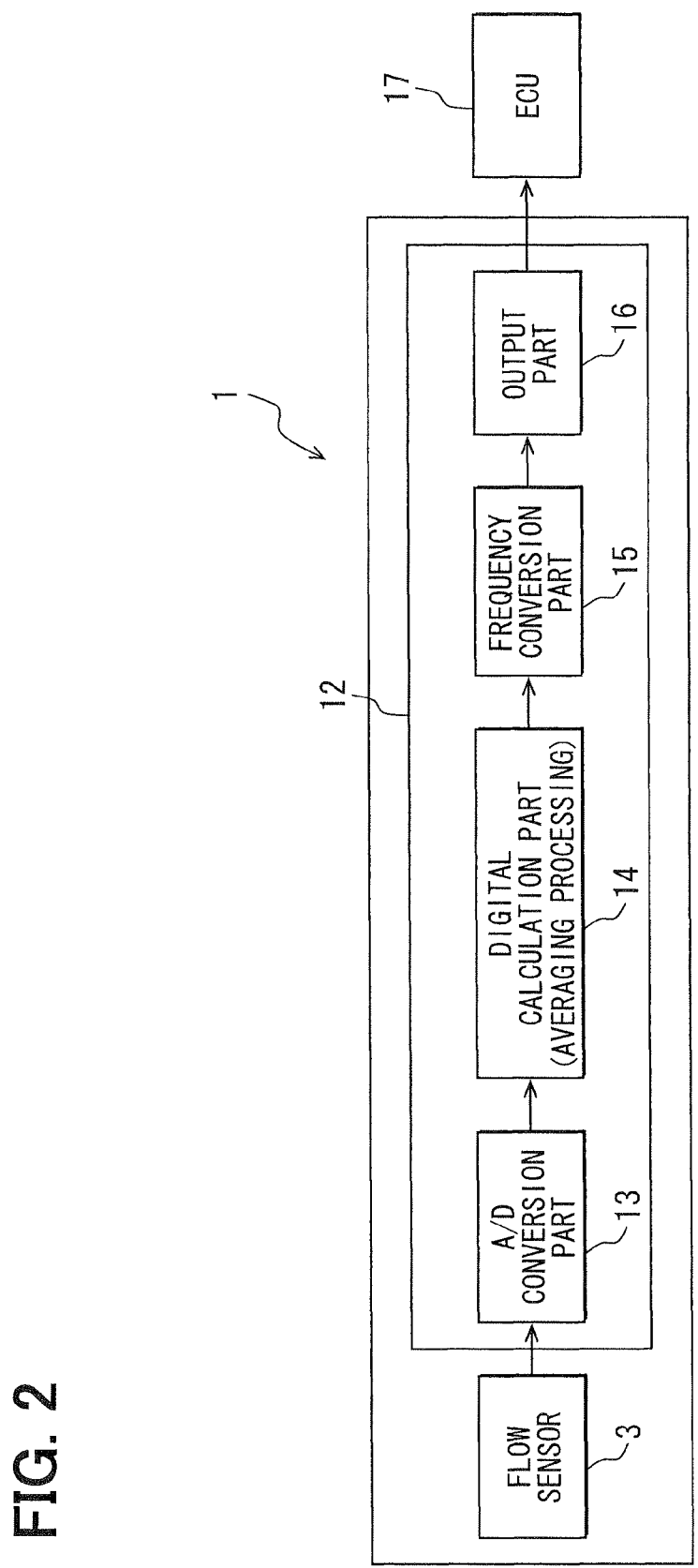
FIG. 2 is a block diagram illustrating a basic configuration of the flow measuring device in accordance with the first embodiment.

A configuration of a flow measuring device 1 of a first embodiment of the invention will be described in reference to FIGS. 1 to 3. The flow measuring device 1 is an air flow meter that measures the amount of suction air of an engine for an automobile, for example, and is attached to a duct 2, which is connected to a downstream side of an air cleaner. The flow measuring device 1 includes a flow sensor 3 (flow rate detecting part) that outputs a detection signal in accordance with a flow of air, and a circuit module 4 that is electrically connected to the flow sensor 3 and that has an electronic circuit, which controls input/output of the flow sensor 3 (see FIG. 1).

The flow sensor 3 includes a heat generating element (not shown) and a temperature-sensitive element (not shown) made of a thin-film resistance on a surface of a semiconductor substrate. The flow measuring device 1 includes a resin housing 6 that defines a bypass flow passage 5, into which a part of air (mainstream) flowing through the duct 2 flows. The flow sensor 3 is disposed in the bypass flow passage 5, and outputs a voltage signal in accordance with a flow rate of air flowing through the bypass flow passage 5. In the present embodiment, the bypass flow passage 5 has a sub bypass flow passage 7 branching further from this bypass flow passage 5, and the flow sensor 3 is disposed in the sub bypass flow passage 7. An outlet 8 of the sub bypass flow passage 7 opens in a downstream direction of the mainstream at a side surface of the housing 6.

The circuit module 4 is connected to the flow sensor 3 such that the module 4 can output a signal to the sensor 3 or the sensor 3 can input the signal into the module 4. An electronic circuit, which calculates a detection signal outputted from the flow sensor 3 and which amplifies and outputs the signal, such as a calculation processing circuit 12, is integrated into the module 4 (see FIG. 2). The calculation processing circuit 12 includes an analog/digital (A/D) conversion part 13, a digital calculation part 14 (signal processing part), a frequency conversion part 15, and an output part 16 (see FIG. 2).

The A/D conversion part 13 is a circuit that converts the flow voltage signal from the flow sensor 3 into digital data. The digital calculation part 14 is a circuit that performs calculation processing using the digital data for the flow voltage signal (i.e., flow digital data) obtained by the A/D conversion part 13. The frequency conversion part 15 is a circuit that converts the flow digital data outputted from the digital calculation part 14 into a frequency signal and that outputs the signal as a flow rate signal. The output part 16 is a circuit that outputs the frequency signal obtained by the frequency conversion part 15 to an engine control unit (ECU) 17.

Characteristics of the flow measuring device 1 in accordance with the first embodiment will be described below. In the flow measuring device 1 of the first embodiment, averaging processing is carried out at the digital calculation part 14 using a moving average of a predetermined number (two or more) of consecutive flow digital data. Then, the averaged flow digital data is converted into the frequency signal at the frequency conversion part 15, and the signal is outputted to the ECU 17 as the flow rate signal. Various methods such as simple moving average, weighted moving average, and exponential moving average can be employed for a method for the averaging.

Figure 3:
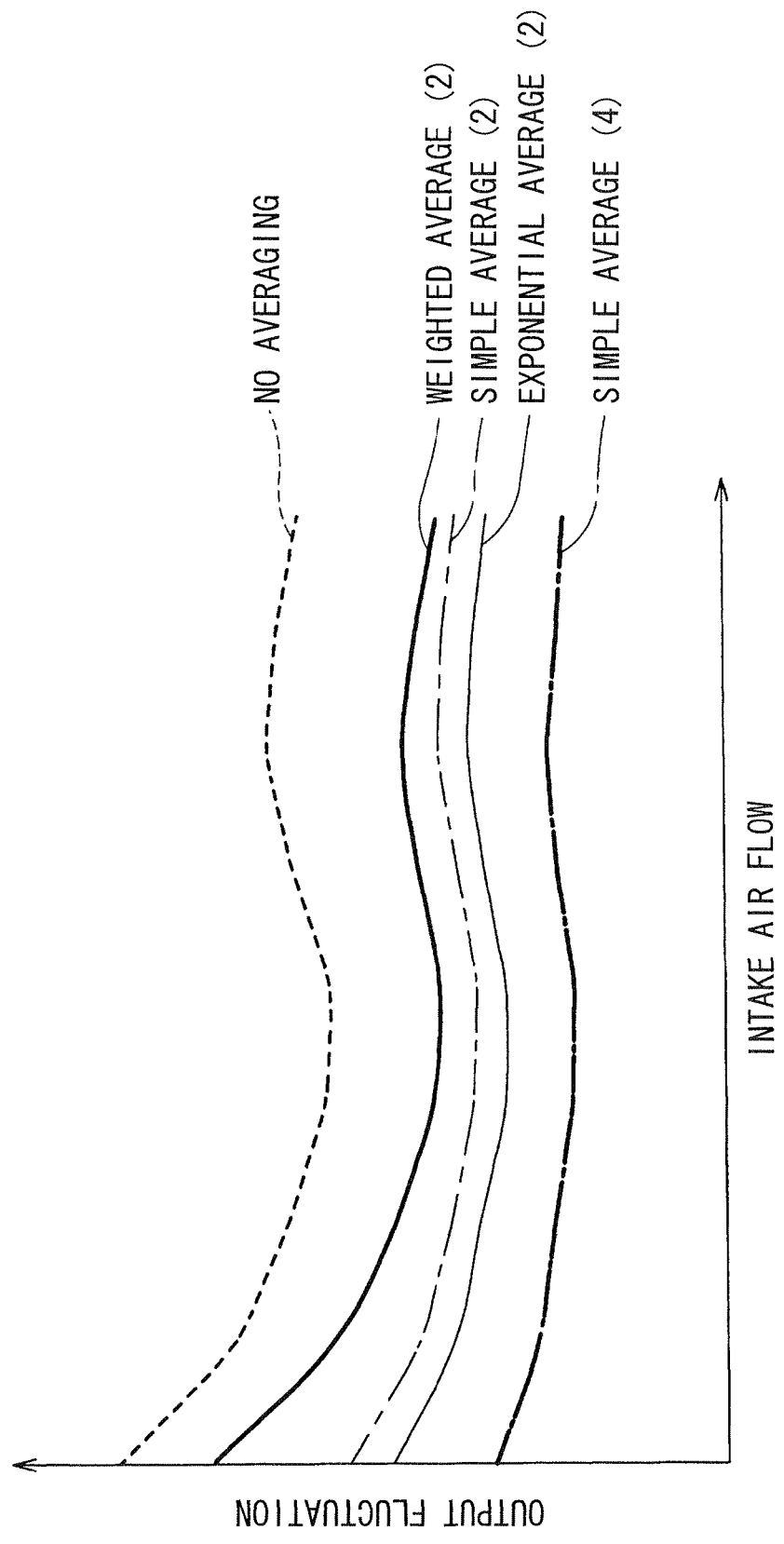
FIG. 3 is a diagram illustrating an effect of averaging processing in accordance with the first embodiment.

FIG. 3 is a diagram illustrating a range of fluctuations of the flow rate signal after being averaging-processed and the flow rate signal which has not been averaging-processed. In FIG. 3, as an example, the range of fluctuations of a flow rate signal which has been averaging-processed through the simple moving average that calculates sequentially an average value of two consecutive data (simple average (2)); a flow rate signal which has been averaging-processed through the weighted moving average of two continuous data (weighted average (2)); a flow rate signal which has been averaging-processed through the exponential moving average of two continuous data (exponential average (2)); and a flow rate signal which has been averaging-processed through the simple moving average that calculates sequentially an average value of four continuous data (simple average (4)), is indicated.

It is shown from FIG. 3 that the fluctuation range of the flow rate signal is smaller in the case of implementation of averaging processing than in the case in which averaging processing is not performed (NO AVERAGING). As a result of the implementation of averaging processing, the output fluctuation from the flow measuring device 1 is reduced, so that rotation fluctuation and torque fluctuation can be made small.

In the present embodiment, the averaging processing is performed on flow digital data inside the flow measuring device 1. Thus, the averaging processing can be carried out using all the digital data in accordance with a sampling period of digital data conversion for the flow voltage signal.

In addition, in the case of introducing the data outputted from the flow measuring device 1 onto the ECU 17 and averaging-processing the data inside the ECU 17, the ECU 17 loads the data of the flow measuring device 1 only with a predetermined period. Accordingly, if the sampling period of A/D conversion for the voltage signal is short, the ECU 17 cannot load all the data. Thus, accuracy of averaging may be reduced and flow detection accuracy may thereby deteriorate. However, in the present embodiment, the averaging processing can be performed using all the flow digital data inside the flow measuring device 1. Therefore, accuracy of the averaging processing can be improved compared with the case of loading the data into the ECU 17 and averaging-processing the data in the ECU 17.

Second Embodiment

A flow measuring device 1 in accordance with a second embodiment of the invention will be described with a focus on the respects different from the first embodiment. In the flow measuring device 1 of the second embodiment, the number of data for averaging which are used for averaging processing at a digital calculation part 14 is switched depending on operating conditions. Thus, in the flow measuring device 1, the range of fluctuation of the air flow rate for time series is monitored, and the number of data is determined in accordance with the fluctuation range.

For example, in the case of the range of fluctuation being within a predetermined value, moving average is calculated using the large number (e.g., six pieces) of data; and in the case of the fluctuation range being the predetermined value or greater, moving average is calculated using the small number (e.g., four pieces) of data. Consequently, in addition to the effect by the first embodiment, an effect of improving averaging accuracy even in operating conditions of the wide range of fluctuation of an air flow is produced.

Third Embodiment

Figure 4:
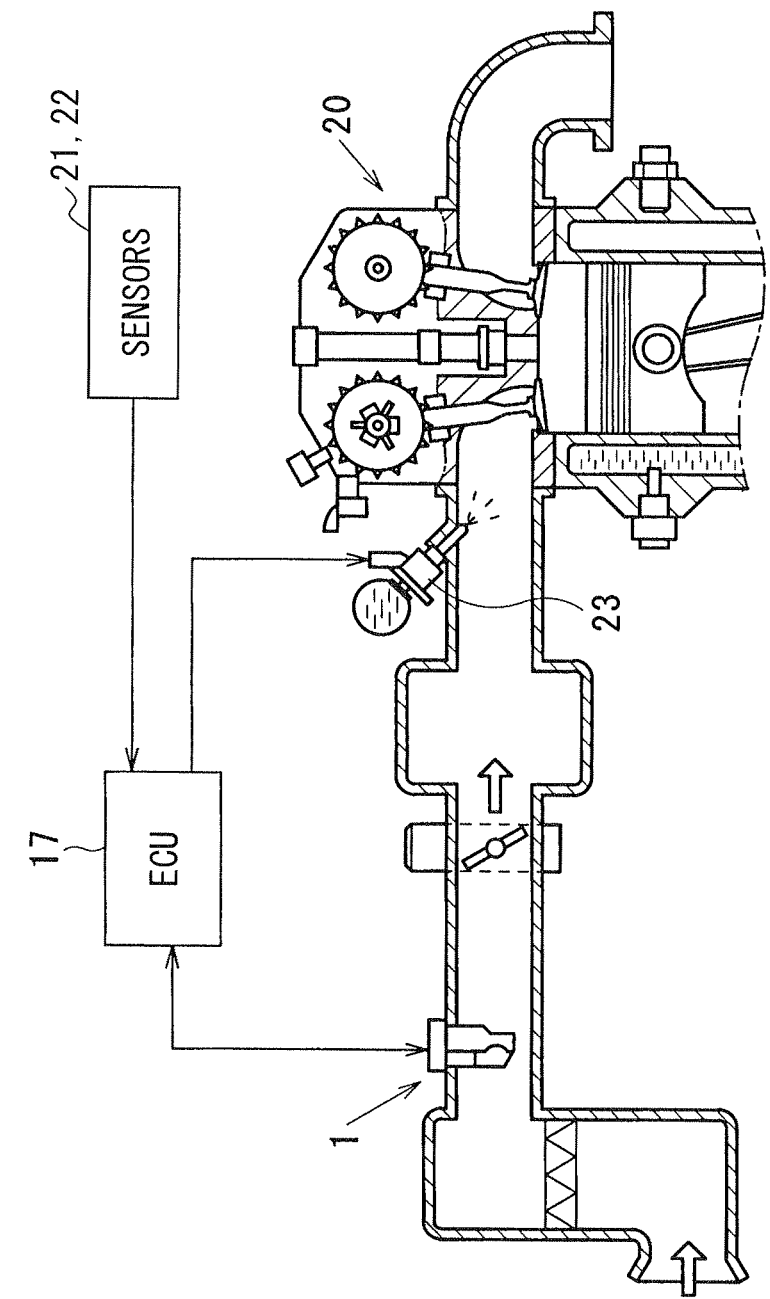
FIG. 4 is a schematic diagram illustrating an internal combustion engine (gasoline engine) including a flow measuring device and its peripheral equipment in accordance with a third embodiment of the invention.

A flow measuring device 1 in accordance with a third embodiment of the invention will be described in reference to FIG. 4 with a focus on the respects different from the second embodiment. The flow measuring device 1 of the third embodiment is disposed in a gasoline engine 20, and the number of data for averaging which are used for averaging processing at a digital calculation part 14 is switched in accordance with fluctuations of an engine rotational speed and a throttle opening degree.

More specifically, the fluctuations of the engine rotational speed and the throttle opening degree are monitored inside the ECU 17 by output signals from an engine rotational speed sensor 21 and a throttle opening degree sensor 22, which are inputted into an ECU 17. When a range of the fluctuations of the rotational speed and the opening degree becomes a predetermined value or wider, a data number switching command is sent from the ECU 17 to the digital calculation part 14, and the number of data for averaging which are used for averaging processing at the digital calculation part 14 is switched. The ECU 17 calculates injection quantity based on a flow rate signal inputted from the flow measuring device 1, and transmits a control signal to an injector 23.

Accordingly, an effect similar to the second embodiment can be produced besides the effect by the first embodiment. Additionally, instead of the fluctuations of the engine rotational speed and the throttle opening degree, torque fluctuation may be monitored; and in accordance with a range of the torque fluctuation, the number of data for averaging which are used for averaging processing at the digital calculation part 14 may be changed.

Fourth Embodiment

Figures 5A, 5B:
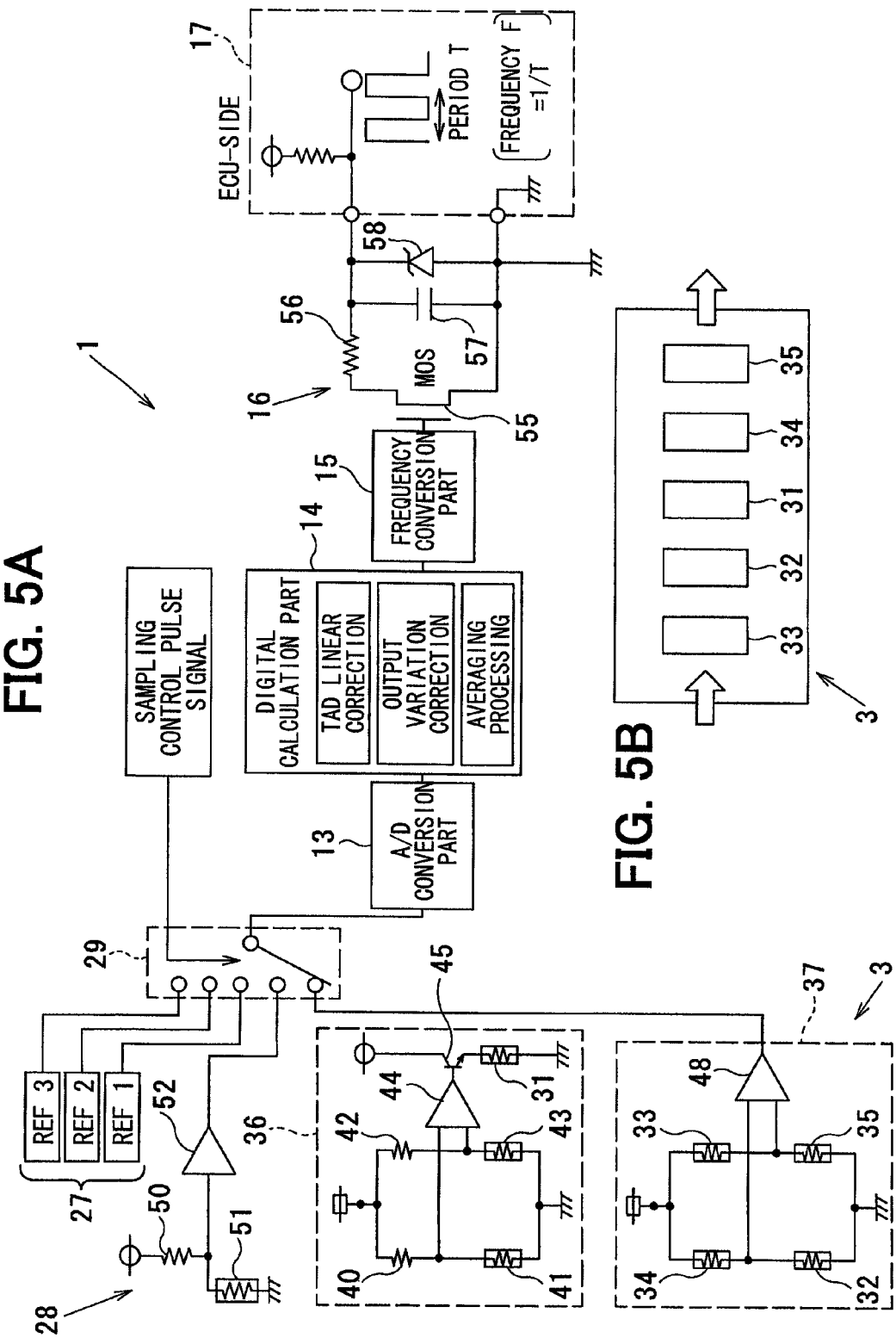
FIG. 5A is a block diagram illustrating a basic configuration of a flow measuring device in accordance with a fourth embodiment of the invention.
FIG. 5B is a schematic view illustrating a sensor chip in accordance with the fourth embodiment.

A flow measuring device 1 in accordance with a fourth embodiment of the invention will be described in reference to FIGS. 5A to 6 with a focus on the respects different from the first embodiment. The flow measuring device 1 of the fourth embodiment includes a reference voltage generating part 27 that outputs reference voltage signals, a temperature detecting part 28 that detects temperature of air flowing through a flow passage, and a multiplexer 29 that selects sequentially signals in a predetermined order, in addition to a flow sensor 3, an A/D conversion part 13, a digital calculation part 14, a frequency conversion part 15, and an output part 16 (see FIG. 5A).

In the flow sensor 3 of the present embodiment, a heat generating resistance 31 is disposed at the center of a thin film part of a sensor chip (silicon chip or circuit substrate). With this heat generating resistance 31 serving as the arrangement center, temperature detecting resistors 32, 33 for detecting an air flow voltage signal are arranged on its upstream side along a flow direction of air (intake air flow direction), and temperature detecting resistors 34, 35 for detecting the air flow voltage signal are arranged on its downstream side (see FIG. 5B). The flow sensor 3 includes a heater temperature control circuit 36 that controls generated heat temperature of the heat generating resistance 31, and an air flow rate detecting circuit 37 that outputs a voltage in accordance with a flow rate and a flow direction of air flowing through a duct 2 based on a temperature distribution created by the heat generation of the heat generating resistance 31.

A resistance value of the heat generating resistance 31 changes according to temperature, and the resistance 31 generates heat when a heating current flows. The heater temperature control circuit 36 includes a fixed resistor 40 and a temperature detecting resistor 41, which are connected in series, and a fixed resistor 42 and an indirect heat resistor 43, which are connected in series. A heater temperature control bridge circuit (first bridge circuit) is thereby configured in the circuit 36.

The temperature detecting resistor 41 is a temperature-sensitive resistance whose resistance value changes according to its surrounding temperature (intake air temperature). The resistor 41 is disposed at a position on the sensor chip where the resistor 41 is not influenced by the heat generation of the heat generating resistance 31. The indirect heat resistor 43 is a temperature-sensitive resistance whose resistance value changes according to the heat of the heat generating resistance 31. The resistor 43 is disposed at a position on the sensor chip where the resistor 43 is influenced by the heat generation of the heat generating resistance 31. A predetermined power supply voltage (constant voltage of 5V or lower) is applied to a connecting point between the fixed resistor 40 and the fixed resistor 42 in the first bridge circuit. An electric potential of a connecting point between the temperature detecting resistor 41 and the indirect heat resistor 43 in the first bridge circuit is the ground (GND) electric potential.

The heater temperature control circuit 36 includes a differential amplifier (operational amplifier) 44 and a transistor 45 besides the first bridge circuit. The circuit 36 is configured to variably control electric power supplied to the heat generating resistance 31 in accordance with the intake air temperature detected by the temperature detecting resistor 41 so as to make higher by a certain temperature the temperature of the indirect heat resistor 43 than the intake air temperature detected by the temperature detecting resistor 41.

The air flow rate detecting circuit 37 includes the temperature detecting resistor 32 and the temperature detecting resistor 34, which are connected in series, and the temperature detecting resistor 33 and the temperature detecting resistor 35, which are connected in series. A flow rate signal detecting bridge circuit (second bridge circuit) is thereby configured in the circuit 37. The temperature detecting resistors 32 to 35 are respectively temperature detecting temperature-sensitive resistances whose resistance values change according to temperature. On the upstream side of the heat generating resistance 31, the temperature detecting resistor 32 and the temperature detecting resistor 33 are arranged in order from the downstream side. On the downstream side of the heat generating resistance 31, the temperature detecting resistor 34 and the temperature detecting resistor 35 are arranged in order from the upstream side (see FIG. 5B).

A power supply voltage (constant voltage of 5V or lower) is applied to a connecting point between the temperature detecting resistor 34 and the temperature detecting resistor 33 in the second bridge circuit. An electric potential of a connecting point between the temperature detecting resistor 32 and the temperature detecting resistor 35 in the second bridge circuit is the ground (GND) electric potential. The air flow rate detecting circuit 37 includes a differential amplifier (operational amplifier) 48 in addition to the second bridge circuit. A bridge output voltage of the second bridge circuit (electric potential difference between bridges) is obtained by the differential amplifier 48, and the circuit 37 amplifies this bridge output voltage and outputs it to the multiplexer 29 as an air flow voltage signal Vq.

The reference voltage generating part 27 is a circuit that outputs three types of reference voltage signals (reference voltage signals Vref1, Vref2, Vref3) whose voltage values are different from each other. The generating part 27 includes first to third reference potential generating parts REF 1 to 3 that output the reference voltage signals Vref1 to Vref3 respectively to the multiplexer 29. The reference voltage signals Vref1 to Vref3 are used for linear correction processing (A/D linear correction processing) of analog-to-digital conversion characteristics, which is described in greater detail hereinafter.

The temperature detecting part 28 is a circuit that is disposed on the sensor chip to detect temperature of flowing air (intake air temperature) and outputs a voltage in accordance with this intake air temperature. The detecting part 28 includes a fixed resistor 50 and a temperature detecting resistor 51, which are connected in series. The detecting part 28 is configured such that a divided voltage value of a constant voltage Vcc can be obtained from a connecting point between the fixed resistor 50 and the temperature detecting resistor 51 through the application of the constant voltage Vcc to one end of the fixed resistor 50. The divided voltage value of the constant voltage Vcc is amplified through an operational amplifier 52 to be outputted to the multiplexer 29 as an intake air temperature voltage signal Vt.

The reference voltage generating part 27 that outputs the reference voltage signals (Vref1, Vref2, Vref3) is connected to three first to third analog switches of five analog switches of the multiplexer 29. The temperature detecting part 28 that outputs the intake air temperature voltage signal Vt is connected to the fourth analog switch. The air flow rate detecting circuit 37 that outputs the air flow voltage signal Vq is connected to the fifth analog switch.

The A/D conversion part 13 sequentially samples first to fifth analog input voltage signals (the reference voltage signal Vref3, the reference voltage signal Vref2, the reference voltage signal Vref1, the intake air temperature voltage signal Vt, and the air flow voltage signal Vq) in the order of selection by the multiplexer 29. Also, each time the first to fifth analog input voltage signals are respectively sampled, the conversion part 13 converts the first to fifth analog input voltage signals respectively into digital data.

The linear correction processing and output variation correction processing (described in greater detail hereinafter) are performed by the digital calculation part 14 upon the flow digital data from the A/D conversion part 13. The calculation part 14 also carries out averaging processing of the flow digital data. The frequency conversion part 15 converts the flow digital data outputted from the digital calculation part 14 into the frequency signal. The output part 16 includes an n-type metal-oxide semiconductor field effect transistor (NMOSFET) 55, a fixed resistor 56, a bypass capacitor 57, and a zener diode 58. The output part 16 outputs the frequency signal outputted from the frequency conversion part 15 to a microcomputer of the ECU 17.

In the present embodiment, the multiplexer 29 is configured such that the multiplexer 29 outputs the air flow voltage signal Vq to the A/D conversion part 13 each time the multiplexer 29 outputs one voltage signal of the reference voltage signals Vref3, Vref2, Vref1 and the intake air temperature voltage signal Vt to the A/D conversion part 13 in accordance with a sampling control pulse signal. Thus, the multiplexer 29 is configured to insert sampling timing for the air flow voltage signal Vq between sampling timings for two adjacent analog input voltage signals of the reference voltage signals Vref3, Vref2, Vref1, and the intake air temperature voltage signal Vt. As a result of this, a sampling period T2 for the air flow voltage signal Vq can be made short.

Figure 6:
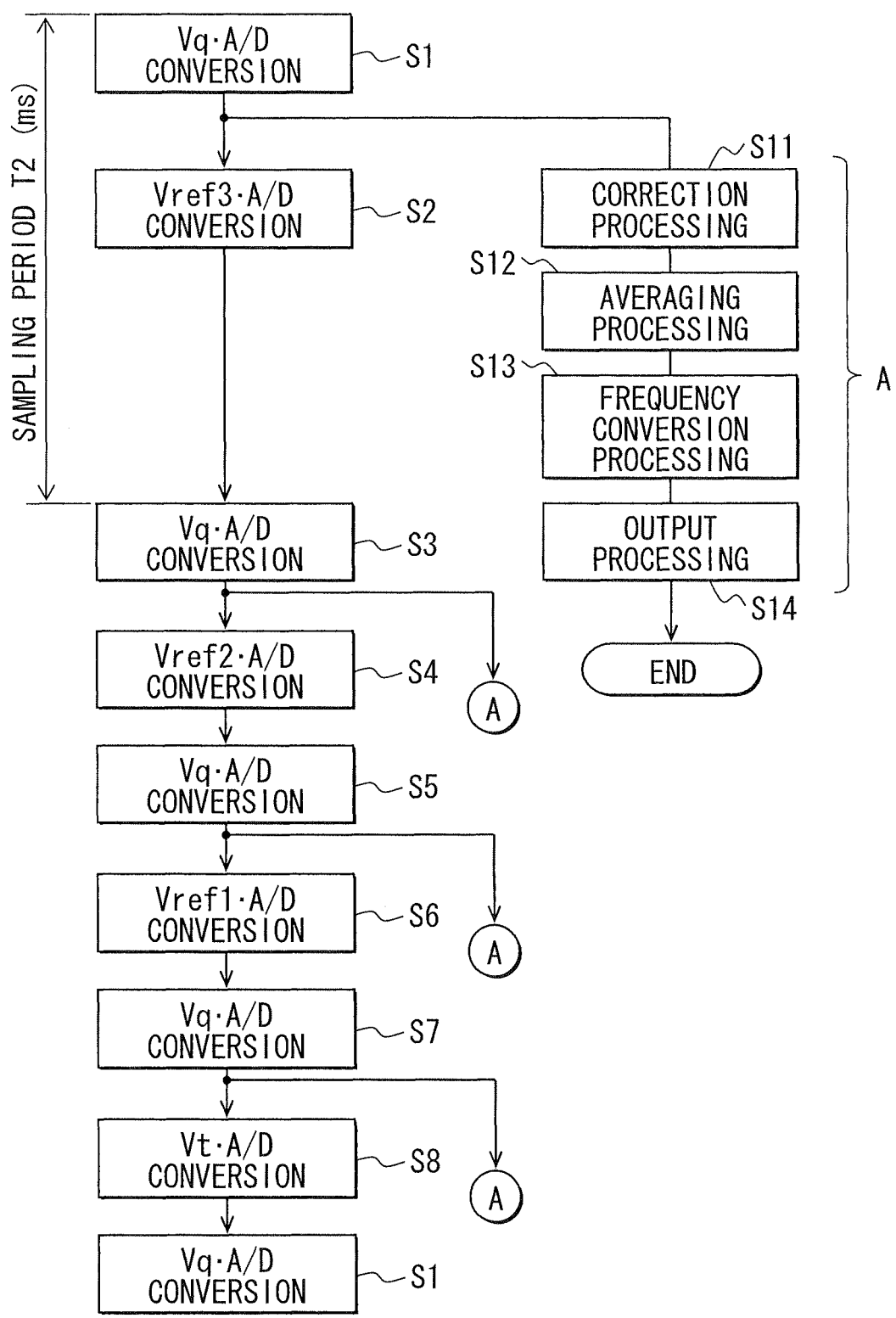
FIG. 6 is a flow chart illustrating timing for sampling a reference voltage signal, a temperature voltage signal and a flow voltage signal in accordance with the fourth embodiment.

Specifically, processing illustrated in a flow chart in FIG. 6 is performed. The air flow voltage signal Vq is A/D converted, and digital data (flow digital data) which is a result of A/D conversion (A/D conversion output data) is stored in a register (S1). Then, sampling timing of the air flow voltage signal Vq is inserted between sampling timing of the reference voltage signal Vref3 and sampling timing of the reference voltage signal Vref2 (S2 to S3). In parallel with the processing at S2 to S3, the A/D linear correction processing and the output variation correction processing, which are described in greater detail hereinafter, are performed upon the flow digital data (S11). Averaging processing is performed on the flow digital data after the correction processing (S12), and frequency conversion processing for converting the flow digital data after the averaging processing into the frequency signal is performed (S13). After that, the frequency signal obtained at S13 is outputted into the ECU 17 (S14). At S12, the averaging processing using the moving average described in the first to third embodiments is carried out.

At S4 to S8 as well, the processing at S11 to S14 is performed every time the flow digital data of the air flow voltage signal Vq is stored in the register. The digital data on the reference voltage signals Vref3, Vref2, Vref1, the intake air temperature voltage signal Vt is also stored in the register (S2, S4, S6, S8). The above digital data is used for the A/D linear correction processing and the output variation correction processing.

The A/D linear correction processing will be explained below. The analog-to-digital conversion characteristics of the A/D conversion part 13 have nonlinearity, so that accuracy of final sensor output may be reduced. Accordingly, in the present embodiment, linear correction is performed upon the flow digital data from the A/D conversion part 13. Specifically, an input voltage range Vmin to Vmax into the A/D conversion part 13 is divided equally into a first region and a second region with a center voltage Vc as their boundary. For each region, a curve indicating the analog-to-digital conversion characteristics is approximated to a straight-line. Then, a conversion equation for converting a point on the approximate straight line into a point on an ideal A/D straight line is developed for each region. By converting the flow digital data from the A/D conversion part 13 using the conversion equation obtained in this manner, the linear correction is achieved. Vmin, Vc, Vmax are the reference voltage signals Vref1, Vref2, Vref3, respectively. An even more specific method for the A/D linear correction processing is described in Japanese Patent No. 4074823.

The output variation correction processing (temperature characteristics correction processing) will be described below. The voltage outputted from the flow sensor 3 in accordance with a flow rate changes according to temperature (intake air temperature). Therefore, output voltage needs to be corrected (temperature characteristics correction) based on the temperature (digital data of the intake air temperature voltage signal Vt). However, due to individual variability of the flow sensor 3, a relationship between output voltage and temperature in accordance with the flow rate may vary for each measured flow rate. Consequently, the temperature characteristics correction of the flow digital data is carried out based not only on the temperature but also on the flow rate. An even more specific method for the output variation correction processing is described in JP-A-2009-288153.

In the fourth embodiment as well, the averaging processing can be performed using all the flow digital data inside the flow measuring device 1. Therefore, accuracy of the averaging processing can be improved compared with the case of loading the data into the ECU 17 and averaging-processing the data in the ECU 17.

To sum up, the flow measuring device 1 of the above-described embodiments may be described as follows.

The flow measuring device 1 is adapted to be attached to a flow passage. The flow measuring device 1 includes a flow rate detecting part 3, an analog/digital conversion part 13, and a signal processing part 14. The flow rate detecting part 3 is configured to detect a flow rate of air flowing through the passage and to output a flow voltage signal Vq, which is a voltage in accordance with the flow rate. The analog/digital conversion part 13 is configured to convert the flow voltage signal Vq from the flow rate detecting part 3 into digital data, which is flow digital data. The signal processing part 14 is configured to perform calculation processing upon the flow digital data, which includes averaging of a predetermined number of consecutive pieces of the flow digital data, and to output the averaged flow digital data as a flow rate signal. The predetermined number is equal to or larger than two.

Accordingly, in the invention, the averaging processing is performed on the flow digital data inside the flow measuring device 1. As a result of this, the averaging processing can be carried out using all the digital data in accordance with the sampling period T2 of digital data conversion for the flow voltage signal Vq. Therefore, accuracy of the averaging processing can be improved compared with the case of loading the data into the ECU 17 and averaging-processing the data in the ECU 17. Thus, output fluctuation is reduced, and flow detection accuracy can be improved.

The signal processing part 14 may average the predetermined number of consecutive pieces of the flow digital data by means of moving average.

The passage may be formed in an air intake duct 2 of an engine. The signal processing part 14 may switch the predetermined number according to an operating condition of the engine. For example, by increasing the number of data for averaging in an operating condition in which an air flow rate is stable, and by decreasing the number of data for averaging in an operating condition in which a flow rate change of the air flow rate is transient, accuracy of averaging can be further improved.

The flow measuring device 1 may further include a frequency conversion part 15 that is configured to convert the averaged flow digital data into a frequency signal and to output the frequency signal as the flow rate signal. For example, when the flow digital data is converted into a voltage signal and the data is outputted to the ECU 17, due to influences of variation in the power supply voltage in the ECU 17; a voltage drop of a harness wire; and fluctuation of contact resistance of a connector or the like, the voltage signal of flow digital data is fluctuated, so that accuracy of the flow detection can be reduced. However, in the case of conversion of the flow digital data into a frequency signal, such influences are eliminated, so that the flow detection accuracy improves.

The flow measuring device 1 may further include a reference voltage generating part 27 and a multiplexer 29. The reference voltage generating part 27 is configured to output a plurality of reference voltage signals Vref1 to Vref3 used for correction processing of the flow voltage signal Vq. The multiplexer 29 is configured to sequentially select the plurality of reference voltage signals Vref1 to Vref3 and the flow voltage signal Vq in a predetermined order. The analog/digital conversion part 13 may sequentially sample the plurality of reference voltage signals Vref1 to Vref3 and the flow voltage signal Vq in the order of the selection thereof by the multiplexer 29, and may convert the plurality of reference voltage signals Vref1 to Vref3 and the flow voltage signal Vq into digital data. The signal processing part 14 may correct the flow digital data using a linear correction equation that is set based on the digital data of the plurality of reference voltage signals Vref1 to Vref3, which are obtained by the analog/digital conversion part 13.

Accordingly, analog-to-digital conversion characteristics of the digital data of the flow voltage signal Vq outputted from the analog/digital conversion part 13 are nonlinear. However, because linear correction is performed on the data at the signal processing part 14, an error of the conversion to digital data can be reduced, so that the flow detection accuracy can be improved.

The flow measuring device 1 may further include a temperature detecting part 28 that is configured to detect temperature of air flowing through the passage and to output a voltage that is in accordance with the temperature. The multiplexer 29 may sequentially select the plurality of reference voltage signals Vref1 to Vref3, a temperature voltage signal Vt, which is an output signal from the temperature detecting part 28, and the flow voltage signal Vq in a predetermined order. The analog/digital conversion part 13 may sequentially sample the plurality of reference voltage signals Vref1 to Vref3, the temperature voltage signal Vt, and the flow voltage signal Vq in the order of the selection thereof by the multiplexer 29, and may convert the plurality of reference voltage signals Vref1 to Vref3, the temperature voltage signal Vt, and the flow voltage signal Vq into digital data. The signal processing part 14 may correct the flow digital data using the digital data of the temperature voltage signal Vt, which is obtained by the analog/digital conversion part 13.

Accordingly, even if there is a variation in flow output characteristics or temperature characteristics because of individual variability of the flow rate detecting part 3, the individual variability of the flow rate detecting part 3 can be corrected, and the flow detection accuracy can thereby be improved.

Additional advantages and modifications will readily occur to those skilled in the art. The invention in its broader terms is therefore not limited to the specific details, representative apparatus, and illustrative examples shown and described.

What is claimed is:

1. A flow measuring device adapted to be attached to a flow passage, the flow measuring device comprising:
   a flow rate detecting part that is configured to detect a flow rate of air flowing through the passage and to output a flow voltage signal, which is a voltage in accordance with the flow rate;
   an analog/digital conversion part that is configured to convert the flow voltage signal from the flow rate detecting part into digital data, which is flow digital data;
   a signal processing part that is configured to perform calculation processing upon the flow digital data, which includes averaging of a predetermined number of consecutive pieces of the flow digital data, and to output the averaged flow digital data as a flow rate signal, wherein:
   the predetermined number is equal to or larger than two; and
   the signal processing part averages the predetermined number of consecutive pieces of the flow digital data by means of moving average;
   a reference voltage generating art that is configured to output a plurality of reference voltage signals used for correction processing of the flow voltage signal; and
   a multiplexer that is configured to sequentially select the plurality of reference voltage signals and the flow voltage signal in a predetermined order, wherein:
   the flow voltage signal is selected between two adjacent reference voltage signals of the plurality of reference voltage signals;
   the analog/digital conversion part sequentially samples the plurality of reference voltage signals and the flow voltage signal in the order of the selection thereof by the multiplexer, and converts the plurality of reference voltage signals and the flow voltage signal into digital data so that each of the plurality of reference voltage signals is respectively A/D converted and the flow voltage signal is also A/D converted; and
   the signal processing part corrects the flow digital data using a linear correction equation that is set based on the digital data of the plurality of reference voltage signals, which are obtained by the analog/digital conversion part.

2. The flow measuring device according to claim 1, wherein:
   the passage is formed in an air intake duct of an engine; and
   the signal processing part switches the predetermined number according to an operating condition of the engine.

3. The flow measuring device according to claim 1, further comprising a frequency conversion part that is configured to convert the averaged flow digital data into a frequency signal and to output the frequency signal as the flow rate signal.

4. The flow measuring device according to claim 1, further comprising a temperature detecting part that is configured to detect temperature of air flowing through the passage and to output a voltage that is in accordance with the temperature, wherein:

- the multiplexer sequentially selects the plurality of reference voltage signals, a temperature voltage signal, which is an output signal from the temperature detecting part, and the flow voltage signal in a predetermined order;
- the flow voltage signal is selected between two adjacent voltage signals of the plurality of reference voltage signals, and the temperature voltage signal;
- the analog/digital conversion part sequentially samples the plurality of reference voltage signals, the temperature voltage signal, and the flow voltage signal in the order of the selection thereof by the multiplexer, and converts the plurality of reference voltage signals, the temperature voltage signal, and the flow voltage signal into digital data; and
- the signal processing part corrects the flow digital data using a linear correction equation that is set based on the digital data of the plurality of reference voltage signals, which are obtained by the analog/digital conversion part, and corrects the flow digital data using the digital data of the temperature voltage signal, which is obtained by the analog/digital conversion part.

\* \* \* \* \*